United States Patent [19]
Kaibach et al.

[11] Patent Number: 6,074,145
[45] Date of Patent: Jun. 13, 2000

[54] UNDERCUT SELF-CUTTING SPREADING ANCHOR

[75] Inventors: Werner Kaibach, Buchloe; Stefan Raber, Kaufering, both of Germany

[73] Assignee: Hilti Aktiengesellschaft, Schaan, Liechtenstein

[21] Appl. No.: 09/208,123

[22] Filed: Dec. 9, 1998

[30] Foreign Application Priority Data

Dec. 20, 1997 [DE] Germany .......................... 197 56 997

[51] Int. Cl.$^7$ .................................................. F16B 13/06
[52] U.S. Cl. .......................................... 411/54.1; 411/30
[58] Field of Search .................................. 411/29–31, 54, 411/54.1, 57.1, 60.3

[56] References Cited

U.S. PATENT DOCUMENTS

| | | | |
|---|---|---|---|
| 3,479,072 | 11/1969 | Kosar . | |
| 3,906,832 | 9/1975 | Lunn | 411/29 |
| 4,702,654 | 10/1987 | Frischmann | 411/31 |
| 5,332,346 | 7/1994 | Shinjo | 411/31 |
| 5,807,049 | 9/1998 | Beck | 411/31 |

FOREIGN PATENT DOCUMENTS

| | | | |
|---|---|---|---|
| 0067941 | 12/1982 | European Pat. Off. . | |
| 104723 | 4/1984 | European Pat. Off. | 411/31 |
| 0195188 | 9/1986 | European Pat. Off. . | |
| 0528679 | 2/1998 | European Pat. Off. . | |

*Primary Examiner*—Flemming Saether
*Attorney, Agent, or Firm*—Brown & Wood, LLP

[57] ABSTRACT

An undercut self-cutting spreading anchor with an anchor rod (5) provided, at one of its ends with a load application element and at another, opposite of its ends, with a head portion (7) a diameter of which increases toward a free end (6) of the anchor rod (5), with the head portion (7) having a substantially crowned shape, a largest diameter region (9), and at least two sections (11, 13) which adjoin the largest diameter region (9) and diameters of which diminish toward the free end (6) of the anchor rod (5), the adjoining section (11, 13) having annular surfaces (12, 13) mean inclination angles of which toward an axis (A) of anchor rod (5) increases in a setting direction (S); and a sleeve (2) displaceable axially along the anchor rod (5) and having a plurality of expansion tabs (3) separated by longitudinal slots and which expand radially upon sliding over the head portion (7) of the anchor rod (5).

14 Claims, 2 Drawing Sheets

UNDERCUT SELF-CUTTING SPREADING ANCHOR

SUMMARY OF THE INVENTION

1. Field of the Invention

The present invention relates to an undercut selfcutting spreading anchor including an anchor rod provided, at its one end, with load application means and, at its opposite end, with a head portion a diameter of which increases toward a free end of the anchor rod and a sleeve displaceable axially along the anchor rod, and having a plurality of expansion tabs separated by longitudinal slots and which expand radially upon sliding of the sleeve over the head portion of the anchor rod.

2. Description of the Prior Art

In the attachment technology, it is often desirable to form connections which are expansion pressure-free to the greatest possible extent. In particular, with small edge and axis distances, the anchoring with a conventional spreading anchor can result in fracture or even in stratification of a constructional component. For such spacing-critical connections or attachments, anchoring systems are used with which a specially formed attachment element is form-lockingly anchored in a preliminary formed bore. To this end, the receiving bore is provided at a predetermined depth with an undercut. The attachment element insertable in the preliminary formed bore includes an anchor rod having a head portion with a diameter increasing toward the free end of the anchor rod, and a sleeve with a plurality of expansion tabs separated by longitudinal slots. The relative movement between the anchor rod and the sleeve leads to the radial expansion of the expansion tabs, which slide over the head portion of the anchor rod and expand, into the undercut.

For forming an undercut, in many cases, a special tool is used which is equipped with cutters, which are eccentrically displaced in a bore of a constructional component and, at a predetermined depth, remove the bore wall material by milling, shaving to expand the circumference of the bore at this region of the bore. Undercut self-cutting spreading anchors, which form undercuts in receiving bores during a setting process, are also generally known. With an undercut self-cutting spreading anchor disclosed, e.g., in German Publication DE-A31 46 027, the undercut is formed by chiseling off the bore wall material resulting from axial displacement of the sleeve along anchor rod supported on the bore bottom. Another type of an undercut self-cutting anchor is disclosed in European Publication EP-BO 217 053. This anchor forms an undercut by milling, shaving off the bore wall material. To this end, the sleeve is rotated during its axial displacement over the head portion of the anchor rod which is supported on the bore bottom. The expansion tabs are provided with cutters which remove, during their rotation, material of the bore wall, forming an undercut.

During the setting process, the anchor rods of these known undercut self-forming spreading anchors are supported on the bore bottom. In order to provide space for the chiseled-off or shaved material of the bore wall, the anchor rods of these anchors include a cylindrical supporting peg, which adjoins the head portion, extends in the axial direction of the anchor rod, and has a diameter which is noticeably smaller than the largest diameter of the head portion. The supporting peg has a relatively large length which requires that the bore be bored to a depth greater than required for the spreading anchor itself. The diameter of the supporting peg corresponds somewhat to the nominal diameter of the anchor rod. During a setting process, there exists a danger of the supporting peg being driven into the bore bottom as result of transmission of the axial impacts from the sleeve to the head portion and the supporting peg. This negatively influences the cutting curve which is described by the cutters of the expansion tabs during the formation of the undercut. The result of this is a non-uniform engagement of the expansion tabs in the undercut. This can lead to that during application of a load, locally, the developed surface pressure between the expansion tabs and the undercut would exceed a predetermined value, resulting in a local destruction of the constructional component in the involved location. This reduces the effectiveness of the anchoring system and can noticeably reduce the desired holding values of the form-locking connection of the spreading anchor with the undercut. Also known are undercut self-cutting anchors without a supporting peg, which eliminated the danger associated with the possibility of the support peg being driven into the bore bottom. However, these spreading anchors has another drawback which consists in that they do not provide any space for the material removable from the bore wall. This can result in a non-complete radial expansion of the expansion tabs and a non-complete setting of the entire spreading anchor. As a result, the desired holding values would not be achieved.

Accordingly, an object of the present invention is to eliminate the drawbacks of the known undercut self-cutting spreading anchors. Another object of the present invention is to provide an undercut self-cutting spreading anchor which can be reliably and completely set in a bore of a constructional component. Impediment to the setting process by material removable from the bore wall should be prevented. The expansion tabs of the undercut self-cutting spreading anchor should be uniformly engaged in the undercut after the completion of the setting process. Local overloading of the constructional component should be prevented. Conditions should be created which would insure unhindered rotation of the anchor rod during the setting process to the most possible extent to thereby prevent any damage of the outer thread of the anchor rod. The necessary bore depth of the receiving bore should be as small as possible.

SUMMARY OF THE INVENTION

These and other objects of the present invention, which will become apparent hereinafter are achieved by providing an undercut self-cutting anchor with an anchor rod provided, at its one end, with load application means and at its opposite end, with a head portion a diameter of which increases toward the free end of the anchor rod. The head portion has a substantially crowned shape and has a largest diameter region and at least two sections which adjoin the largest diameter region and diameters of which diminish toward the free end of the anchor rod. The adjoining sections have annular surfaces mean inclination angles of which toward the axis of the anchor rod increases in a setting direction. A sleeve is displaceable axially along the anchor rod and has a plurality of expansion tabs separated by longitudinal slots and which expand radially upon sliding over the head portion of the anchor rod. The shape of the head portion according to the present invention prevents the head portion from being driven into the bore bottom. The head portion occupies a precisely define position during the entire setting process. This provides a pre-condition for the best possible matching of the cutting curve and the tractrix of the radially expanded expansion tabs which permits to achieve the best possible uniform engagement of the expansion tabs in the formed undercut. The special crowned shape of the head portion with at least two sections, which adjoin the largest diameter portion and have progressively decreasing diameters, also provides for space for the bore wall material removed by the expansion tabs. Thereby, it is insured that the removed material does not hinder the setting process. This also permits to reduce the length of the head portion, and there is no need to form a bore the depth of which exceeds the nominal length of the spreading anchor. The geometrical shape of the head portion provides conditions for rotation of the anchor rod in percussion anchored systems with a self-formed undercut. Thereby, a danger of an anchor rod being damaged by a positively rotatable sleeve in the region of the load application means is reduced substantially.

A most possible surface area of engagement of the head portion with the bore bottom is achieved when the inclination angle of the annular surface of the frontmost section forms with the anchor rod axis an angle which substantially corresponds to the cutting angle of a drill with which the spreading anchor receiving bore is formed. With the inclination angle of the annular surface of the frontmost section amounting from about 50° to about 80°, the greater portion of the range of cutting angles of conventional drills will be covered.

Based on consideration of optimization of the entire length of the undercut self-cutting spreading anchor, it proved to be advantageous when the frontmost section has a length the ratio of which to the total length of all sections adjoining the largest diameter region amounts to from about 0.1 to about 0.8, and preferably, from 0.2 to 0.5.

The largest diameter region of the head portion advantageously has a diameter which is smaller by from 0.2 mm to 3 mm, preferably, from 0.5 mm to 1.5 mm then the largest diameter of the sleeve. In this way after the spreading anchor has been inserted into the receiving bore, an annular clearance remains between the bore wall and the head portion, which favorably influences removal of the material from the engagement region of the cutting front ends of the expansion tabs with the bore wall.

According to one embodiment of the present invention, the largest diameter region is formed as a section of a cylinder, and the adjoining sections have each a shape of a truncated cone. From the manufacturing point of view, two, following each other, truncated cone-shaped sections present an advantage. A ratio of smallest diameters of the two truncated cone-shaped sections is from about 1.5 to about 3.5, preferably from 1.8 to 3.2, and a ratio of a diameter of the largest diameter region to the smallest diameter of the truncated cone-shaped sections which directly adjoins the largest diameter region, is from about 1.2 to about 2.0, preferably, from 1.3 to 1.8.

According to an alternative embodiment which, in particular, facilitate forming the head portion in a coldforming process, the largest diameter region and the adjoining sections have outer surfaces curved in an axial direction. In particular, the two adjoining sections have surfaces narrowing toward the free end. The radius of curvature of the frontmost section is larger than 0 mm but it does not exceed 12 mm. Preferably it ranges from 2 mm to 10 mm. The radius of curvature of the section located between the largest diameter region and the frontmost section is larger than 0 mm but not larger than 20 mm. Preferably it is selected within a range of 5 mm to 15 mm. The radius of curvature of the largest diameter region amounts to from 0.1 mm to 6 mm, preferably 1 mm to 4 mm.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
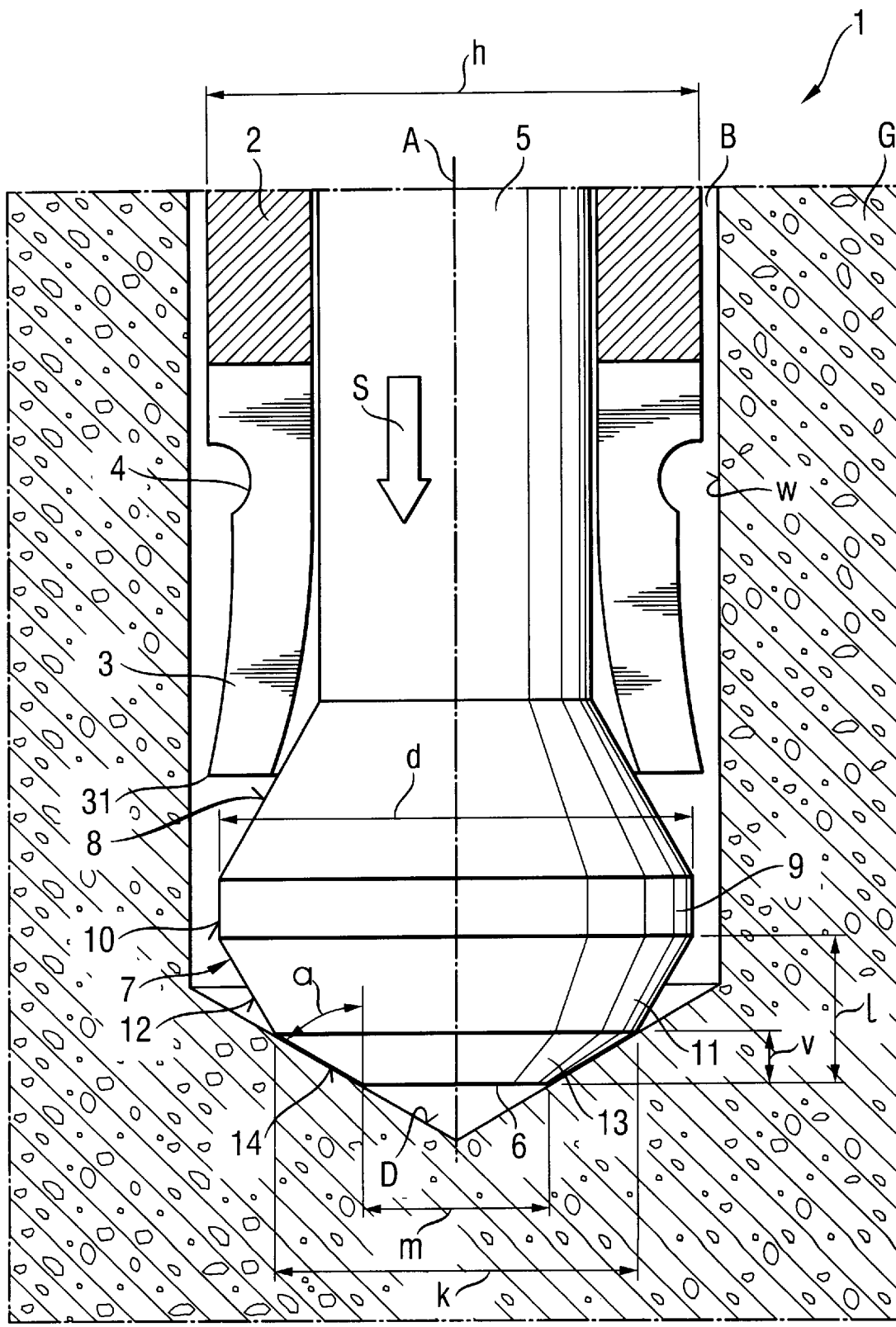
FIG. 1 is partially cross-sectional view of an undercut self-cutting spreading anchor according to the present invention with a first embodiment of the head portion.

An undercut self-cutting spreading anchor according to the present invention, which is shown in FIG. 1, is generally designated with a reference 1. The spreading anchor 1 is inserted into a receiving bore B preliminary formed in a constructional component C. The wall of the receiving bore B is designated with a reference sign W, and the bottom of the receiving bore B is designated with a reference sign D. The setting direction is shown with arrow S. The undercut self-cutting spreading anchor 1 has an anchor rod 5 which is provided, at its rear end, with load application means for attachment of a constructional element. The load application means can be formed, e.g., as an outer thread. At its opposite end, the anchor rod 5 has a head portion 7 the diameter of which increases in the direction toward the front end 6 of the anchor rod 5. A sleeve 2, which is displaceable along the anchor rod 5, has a plurality of expansion tabs 3 separated by longitudinal slots. Upon the displacement of the sleeve 2 in the setting direction S, the expansion tabs 3 slides along a run-on surface 8 of the head portion 7 of the anchor rod 5. The run-on surface 8 is substantially conically shaped. Upon further displacement of the sleeve 5 forward by application of axial impact to its rear portion, the expansion tabs 3 slides further along the run-on surface 8 and expand radially. At that, the leading edges 31 of the expansion tabs 3 or cutting regions or cutters, which can be provided on the expansion tabs 3, remove material from the bore wall W. When the sleeve 2 is driven by application of axial impacts thereto, the removal of the material is effected by chiseling. With simultaneous rotation of the sleeve 2, the material is additionally removed by milling and shaving.

The diameter of the head portion 7 increases toward the free end of the anchor rod 5 up to a largest diameter d defining a substantially cylindrical region 9 having a cylindrical surface 10 which adjoins the run-on conical surface 8. The diameter d of the cylindrical region 9 of the head portion 7 is by about from 0 mm to 3 mm, preferably, from 0.5 mm to 1.5 mm smaller than the largest diameter h of the sleeve 2. The cylindrical region 9 of the head portion 7 is adjoined by two substantially truncated cone-shaped sections 11 and 13. The annular surfaces 12, 14 of the truncated cone-shaped sections 11 and 13, respectively, have a diameter which diminishes toward the free end 6 of the anchor rod 5. The inclination angle of the annular surfaces 12, 14 toward the axis A of the anchor rod 5 increases toward the free end 6. The inclination angle a of the annular surface 14 corresponds, preferably, to a cutting angle of a conventional drill and amounts to about from 50° to 80°. In this way, the inclination angle of the front annular surface 14 corresponds to the inclination angle of the bore bottom D to a most possible extent, and the head portion 7 of the anchor rod 5 can, during the setting process, have a surface support. The front section 13 has a length v which amounts to from about 0.1 to about 0.8 of the entire length 1 of the sections 11 and 13 which adjoin the cylindrical region 9. The truncated cone-shaped section 11, which adjoins the cylindrical region 9, has a smallest diameter k the ratio of which to the smallest diameter m of the front section 13 amounts to from about 1.5 to about 3.5, preferably, from 1.8 to 3.2. The ratio of the diameter d of the cylindrical region g to the smallest diameter k of the adjoining truncated cone-shaped surface 11 amounts to from about 1.2 to about 2.0, preferably, from 1.3 to 1.8.

Figure 2:
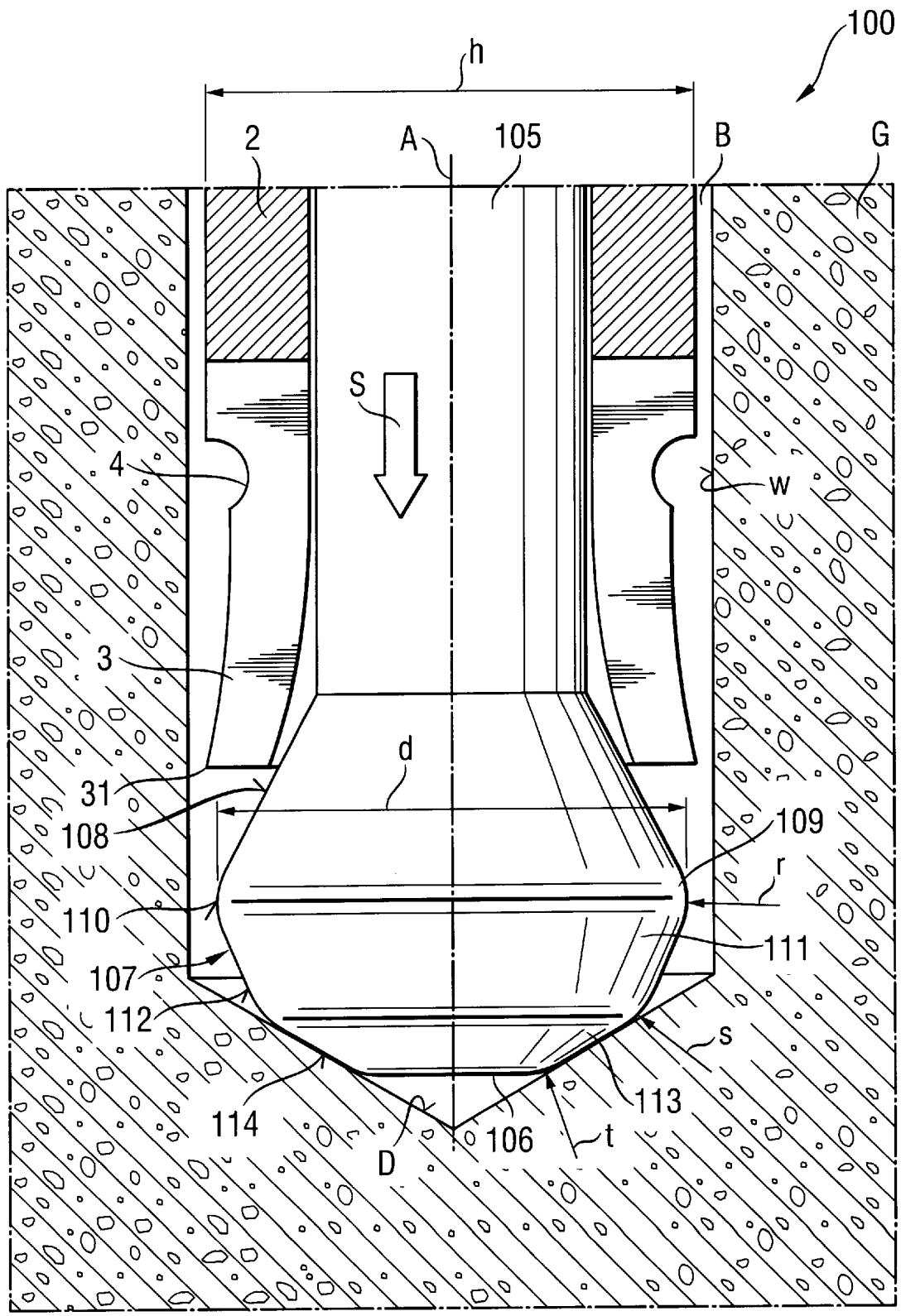
FIG. 2 is a partially cross-sectional view of an undercut self-cutting spreading anchor according to the present invention with a second embodiment of the head portion.

FIG. 2 shows an undercut self-cutting spreading anchor 100 having a modified, in comparison with the spreading anchor 1 shown in FIG. 1, head portion 107. The reference numerals designating elements of the anchor rod of the spreading anchor 107 are increased by 100 in comparison with the reference numerals designating the identical elements of the anchor rod 5 of the spreading anchor 1 shown in FIG. 1. The crowned-shaped head portion 107 has, in its largest diameter region 109, a surface 110 curved in the axial direction. Both adjoining, in the direction toward the front end 106 of the anchor rod 105, sections 111 and 113 likewise have curved surfaces 112, 114. The curvature radii r, s and t are selected to correspond to the following values:

for the curvature radius t of the annular surface 114 of the front section 113, 0 mm<t≦12 mm, preferably, 2 mm≦t≦10 mm;

for the curvature radius s of the annular surface 112 of the section 111, which is located between the largest diameter region 109 and the front section 113, 0 mm<s≦20 mm, preferably, 5 mm≦s≦15 mm;

for the curvature radius r of the annular surface 110 of the largest diameter region 109 0.1 mm≦r≦6 mm, preferably, 1 mm≦r≦4 mm.

The length relationship of the sections 111 and 113 is the same as for the sections 11 and 13 of the head portion 7 shown in FIG. 1.

Although the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An undercut self-cutting spreading anchor, comprising an anchor rod (5) provided at one end thereof, with load application means for supporting an attachment element and, at opposite end thereof, with a head portion (7) having a substantially crowned shape and having a largest diameter region (9), a rear section (8) adjoining the largest diameter region (9) at a side of the largest diameter region (9) facing in a direction opposite to a setting direction (S) and having a diameter decreasing in the direction opposite to the setting direction (S), and at least two front sections (11,13) adjoining the largest diameter region (9) at a side of the largest diameter region (9) facing in the setting direction (S) and having each a diameter progressively decreasing toward a free end (6) of the anchor rod (5), each of the two front sections (11,13) being defined by an annular surface (12,14), with a mean inclination angle of the annular surface (12,14) toward an axis (A) of the anchor rod (5) increasing in the setting direction (S); and a sleeve (2) displaceable axially along the anchor rod (5) and having a plurality of expansion tabs (3) separated by longitudinal slots and expanding radially upon the sleeve sliding over the head portion (7) of the anchor rod (5).

2. An undercut self-cutting spreading anchor according to claim 1, wherein the inclination angle of the annular surface (14) of the a frontmost section (13) of the two front sections (11,13) amounts to from about 50° to about 80°.

3. An undercut self-cutting spreading anchor according to claim 2, wherein the frontmost section (13) has a length (v) a ratio of which to an entire length (1) of the two front sections (11,13) amounts to from about 0.1 to about 0.8.

4. An undercut self-cutting spreading anchor according to claim 3, wherein the ratio of the length (v) of the frontmost section (13) to the length of the two front sections (11, 13) is from 0.2 to 0.5.

5. An undercut self-cutting spreading anchor according to claim 1, wherein the largest diameter region (9) of the head portion (7) has a diameter (d) which is smaller than a largest diameter (h) of the sleeve (2) by from 0.2 mm to 3 mm.

6. An undercut self-cutting spreading anchor according to claim 5, wherein the diameter (d) of the largest diameter region (9) of the head portion (7) is smaller then the largest diameter (h) of the sleeve (2) by from 0.5 mm to 1.5 mm.

7. An undercut self-cutting spreading anchor according to claim 1, wherein the largest diameter region (9) is formed as a section of a cylinder, and the two front sections (11, 13) have each a shape of a truncated cone.

8. An undercut self-cutting spreading anchor according to claim 7, wherein a ratio of smallest diameters (k, m) of the two front truncated cone-shaped sections (11, 13) is from about 1.5 to about 3.5, and wherein a ratio of a diameter (d) of the largest diameter region (9) to the smallest diameter (k) of a front truncated-cone-shape section (11), which directly adjoins the largest diameter region (9), is from about 1.2 to about 2.0.

9. An undercut self-cutting spreading anchor according to claim 8, wherein the ratio of the smallest diameters (k, m) of the two front truncated cone-shaped sections (11, 13) is from 1.8 to 3.2, and wherein the ratio of the diameter (d) of the largest diameter region (9) to the smallest diameter (k) of the front truncated cone-shaped section (11) directly adjoining the largest diameter region (9) is from 1.3 to 1.8.

10. An undercut self-cutting spreading anchor according to claim 1, wherein outer surfaces (110, 112, 114) of the largest diameter region (109) and the two front sections (111, 113) are curved in an axial direction.

11. An undercut self-cutting spreading anchor according to claim 10, wherein a radius (t) of a frontmost section (113) of the two front sections (111,113), a radius (s) of another section (111) of the two front sections (111,113) located between the largest diameter region (109) and the frontmost section (113), and a radius (r) of the largest diameter region (9) have following values:

0 mm<t≦12 mm;

0 mm<s≦20 mm;

0.1 mm≦r≦6 mm.

12. An undercut self-cutting spreading anchor according to claim 11, wherein respective radii (t, s and r) have the following values:

2 mm≦t≦10 mm;

5 mm≦s≦15 mm;

1 mm≦r≦4 mm.

13. An undercut self-cutting spreading anchor according to claim 1, wherein the head portion (7) of the anchor rod (5) is formed in a cold-forming process.

14. An undercut self-cutting spreading anchor according to claim 1, wherein the load application means comprises an outer thread.

* * * * *